(12) United States Patent
Lapp

(10) Patent No.: US 9,470,311 B2
(45) Date of Patent: Oct. 18, 2016

(54) LIGHTWEIGHT ENGINE POWER CELL ASSEMBLY

(75) Inventor: Michael T. Lapp, Bloomfield, MI (US)

(73) Assignee: Mahle International GmbH (DE)

( * ) Notice: Subject to any disclaimer, the term of this patent is extended or adjusted under 35 U.S.C. 154(b) by 938 days.

(21) Appl. No.: 13/523,284

(22) Filed: Jun. 14, 2012

(65) Prior Publication Data

US 2013/0333557 A1    Dec. 19, 2013

(51) Int. Cl.
| | | |
|---|---|---|
| *F16J 1/20* | (2006.01) | |
| *F16J 1/00* | (2006.01) | |
| *B21K 1/18* | (2006.01) | |
| *F02F 3/00* | (2006.01) | |
| *F02F 3/22* | (2006.01) | |

(52) U.S. Cl.
CPC .................. *F16J 1/005* (2013.01); *B21K 1/18* (2013.01); *F02F 3/0023* (2013.01); *F16J 1/20* (2013.01); *F02F 3/22* (2013.01); *Y10T 29/49256* (2015.01); *Y10T 29/49263* (2015.01)

(58) Field of Classification Search
CPC ................ F16J 1/14; F16J 1/20; F16J 1/005; F02F 3/0023; B21K 1/18
USPC ............................ 92/174, 176, 187, 216, 259
See application file for complete search history.

(56) References Cited

U.S. PATENT DOCUMENTS

| | | | |
|---|---|---|---|
| 1,709,316 A * | 4/1929 | Lord ............................... 92/224 |
| 4,704,950 A | 11/1987 | Ripberger et al. | |
| 4,905,577 A | 3/1990 | Schneeweiss | |
| 5,115,725 A | 5/1992 | Horiuchi | |
| 5,158,008 A | 10/1992 | Ripberger et al. | |
| 5,379,680 A | 1/1995 | Bohm et al. | |
| 5,669,285 A * | 9/1997 | Wiczynski et al. ............. 92/157 |
| 5,762,038 A * | 6/1998 | Mielke ................ F02B 23/0696 123/193.6 |
| 6,178,873 B1 | 1/2001 | Pierobon et al. | |
| 6,209,510 B1 | 4/2001 | Brogdon et al. | |
| 6,557,514 B1 * | 5/2003 | Gaiser ......................... 123/193.6 |
| 7,127,981 B2 * | 10/2006 | Endoh et al. .............. 92/165 PR |
| 8,100,048 B2 * | 1/2012 | Christopher .................... 92/187 |
| 9,127,618 B2 | 9/2015 | Azevedo et al. | |
| 2002/0179032 A1 * | 12/2002 | Ribeiro et al. ............. 123/193.4 |
| 2007/0251487 A1 * | 11/2007 | Heidrich et al. ........... 123/193.6 |
| 2009/0084260 A1 | 4/2009 | Christopher | |
| 2009/0151555 A1 * | 6/2009 | Lapp et al. ..................... 92/172 |

FOREIGN PATENT DOCUMENTS

| | | |
|---|---|---|
| DE | 3446121 A1 | 8/1985 |
| GB | 2478999 A | 9/2011 |

* cited by examiner

*Primary Examiner* — Nathaniel Wiehe
*Assistant Examiner* — Abiy Teka
(74) *Attorney, Agent, or Firm* — Fishman Stewart PLLC

(57) ABSTRACT

Exemplary power cell assemblies and methods of making the same are disclosed. An exemplary power cell assembly may include a piston crown and connecting rod. In an exemplary illustration, a power cell assembly includes a piston crown having a ringland extending circumferentially about a combustion bowl. The boss portions may each include inwardly extending shoulders defining arcuate crown running surfaces. The power cell assembly may further include a connecting rod having a shank and an upper end received in a cavity of the crown. The upper end of the connecting rod may define arcuate connecting rod running surfaces extending away from the shank. The crown running surfaces and connecting rod running surfaces generally allow the connecting rod to pivot with respect to the piston crown about an axis of rotation that extends from one of the boss portions to the other of the boss portions.

20 Claims, 4 Drawing Sheets

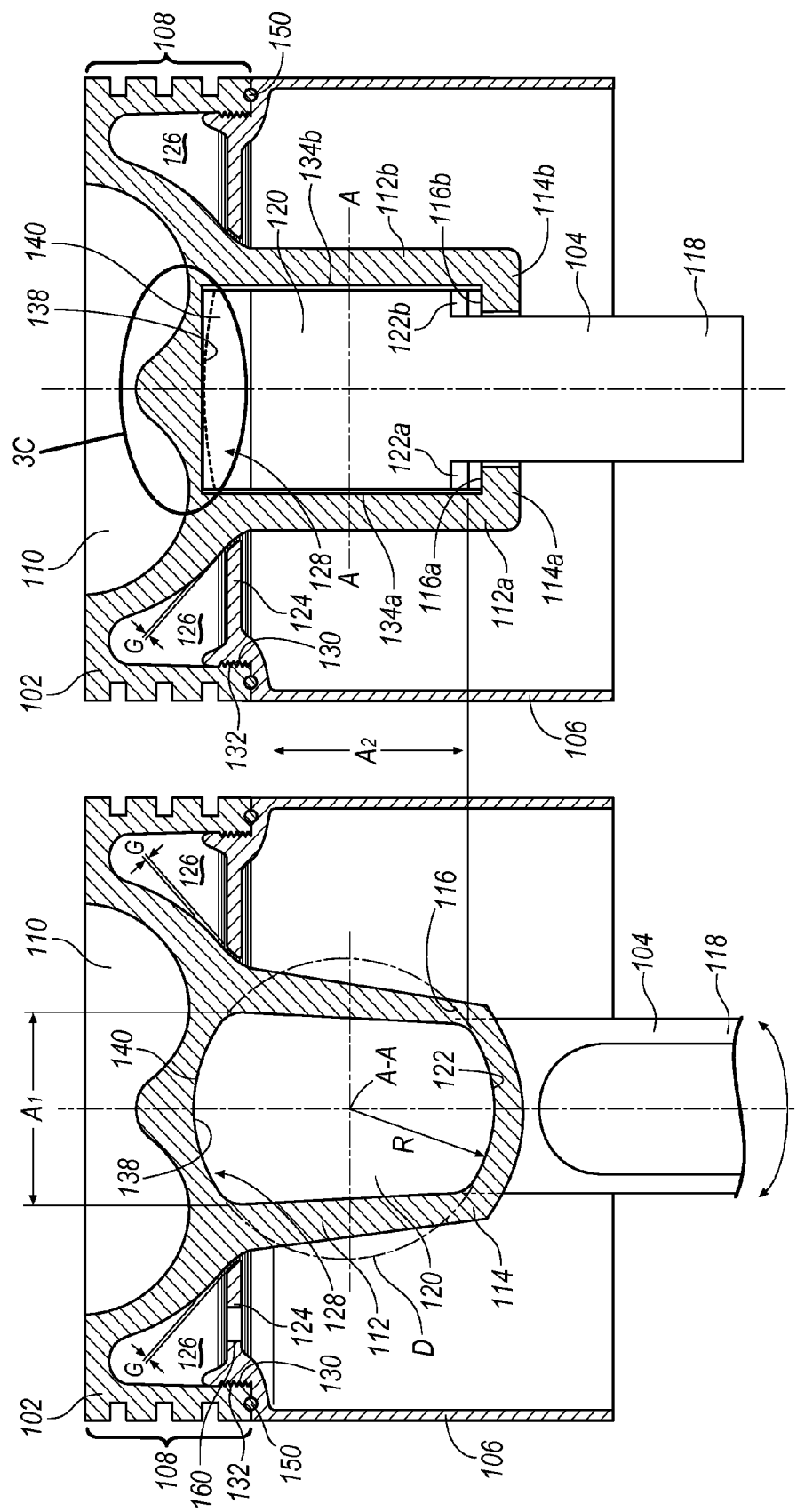

LIGHTWEIGHT ENGINE POWER CELL ASSEMBLY

BACKGROUND

A power cell of an internal combustion engine generally comprises a reciprocating piston disposed within a cylindrical cavity of an engine block, and a connecting rod which joins a lower portion of the piston to a crankshaft. One end of the cylindrical cavity may be closed while another end of the cylindrical cavity may be open. The closed end of the cylindrical cavity and an upper portion or crown of the piston defines a combustion chamber. The open end of the cylindrical cavity permits oscillatory movement of the connecting rod, which is typically linked to the piston by a piston pin that is received within a piston pin bore defined by the piston. The crankshaft converts linear motion of the piston (resulting from combustion of fuel in the combustion chamber) into rotational motion.

Engines, and in particular the power cell assemblies, are under subject to constant efforts to increase overall efficiency, e.g., by reducing weight of the power cell assemblies and/or increasing pressures and temperatures associated with engine operation. As noted above, known power cell designs have typically employed a piston pin that is inserted into the pin bore of the piston, thereby retaining the connecting rod to the piston body. Moreover the piston pin allows the connecting rod to pivot with respect to the piston body as the piston reciprocates within the power cylinder during engine operation. However, the piston pin increases overall weight and complexity of the power cell assembly. While some power cell designs are known that eliminate the piston pin, known solutions suffer from drawbacks such as an inefficient transfer of reciprocal motion of the piston to rotational motion of the crankshaft, instability in the joint, or necessitate a complex assembly of the power cell.

Accordingly, there is a need for a more robust, lightweight power cell design that offers reduced overall weight, e.g., by eliminating the piston pin, while providing a stable and efficient connection between the connecting rod and the piston body.

BRIEF DESCRIPTION OF THE DRAWINGS

While the claims are not limited to the illustrated examples, an appreciation of various aspects is best gained through a discussion of various examples thereof. Referring now to the drawings, exemplary illustrations are shown in detail. Although the drawings represent representative examples, the drawings are not necessarily to scale and certain features may be exaggerated to better illustrate and explain an innovative aspect of an illustrative example. Further, the exemplary illustrations described herein are not intended to be exhaustive or otherwise limiting or restricting to the precise form and configuration shown in the drawings and disclosed in the following detailed description. Exemplary illustrations are described in detail by referring to the drawings as follows:

FIG. 3A illustrates a sectional view of an exemplary power cell assembly, taken through the pivot plane of the connecting rod;

FIG. 3B illustrates a sectional view of an exemplary power cell assembly, taken through a plane orthogonal to the pivot plane of the connecting rod;

DETAILED DESCRIPTION

Reference in the specification to "an exemplary illustration", an "example" or similar language means that a particular feature, structure, or characteristic described in connection with the exemplary approach is included in at least one illustration. The appearances of the phrase "in an illustration" or similar type language in various places in the specification are not necessarily all referring to the same illustration or example.

Various exemplary illustrations are provided herein of power cell assemblies and methods of making the same. Power cell assemblies may generally include a piston crown and connecting rod, and in some examples may further include a piston skirt. In one exemplary illustration, a power cell assembly includes a piston crown having a ringland extending circumferentially about a combustion bowl. The crown further includes two boss portions extending downward from the combustion bowl to define a cavity therebetween. The boss portions may each include inwardly extending shoulders defining arcuate crown running surfaces. The power cell assembly may further include a connecting rod having a shank and an upper end received in the cavity of the crown. The upper end of the connecting rod may define arcuate connecting rod running surfaces extending away from the shank, with the arcuate running surfaces positioned to mate with the crown running surfaces. The arcuate running surfaces may extend along each of the boss portions, and may allow the connecting rod to pivot with respect to the piston crown about an axis of rotation that extends from one of the boss portions to the other of the boss portions.

An exemplary method of assembling a power cell assembly includes forming a piston crown including a ringland extending circumferentially about a combustion bowl. The crown may have two boss portions extending downward from the combustion bowl to define a cavity therebetween, the boss portions each including inwardly extending shoulders defining arcuate crown running surfaces. The method may further include inserting a connecting rod having a shank and an upper end into the cavity. The upper end of the connecting rod may define arcuate connecting rod running surfaces extending away from the shank, where the arcuate running surfaces are positioned to mate with the crown running surfaces. Accordingly, the running surfaces of the crown and connecting rod generally allow the connecting rod to pivot with respect to the piston crown about an axis of rotation that extends from one of the boss portions to the other of the boss portions.

Figure 1:
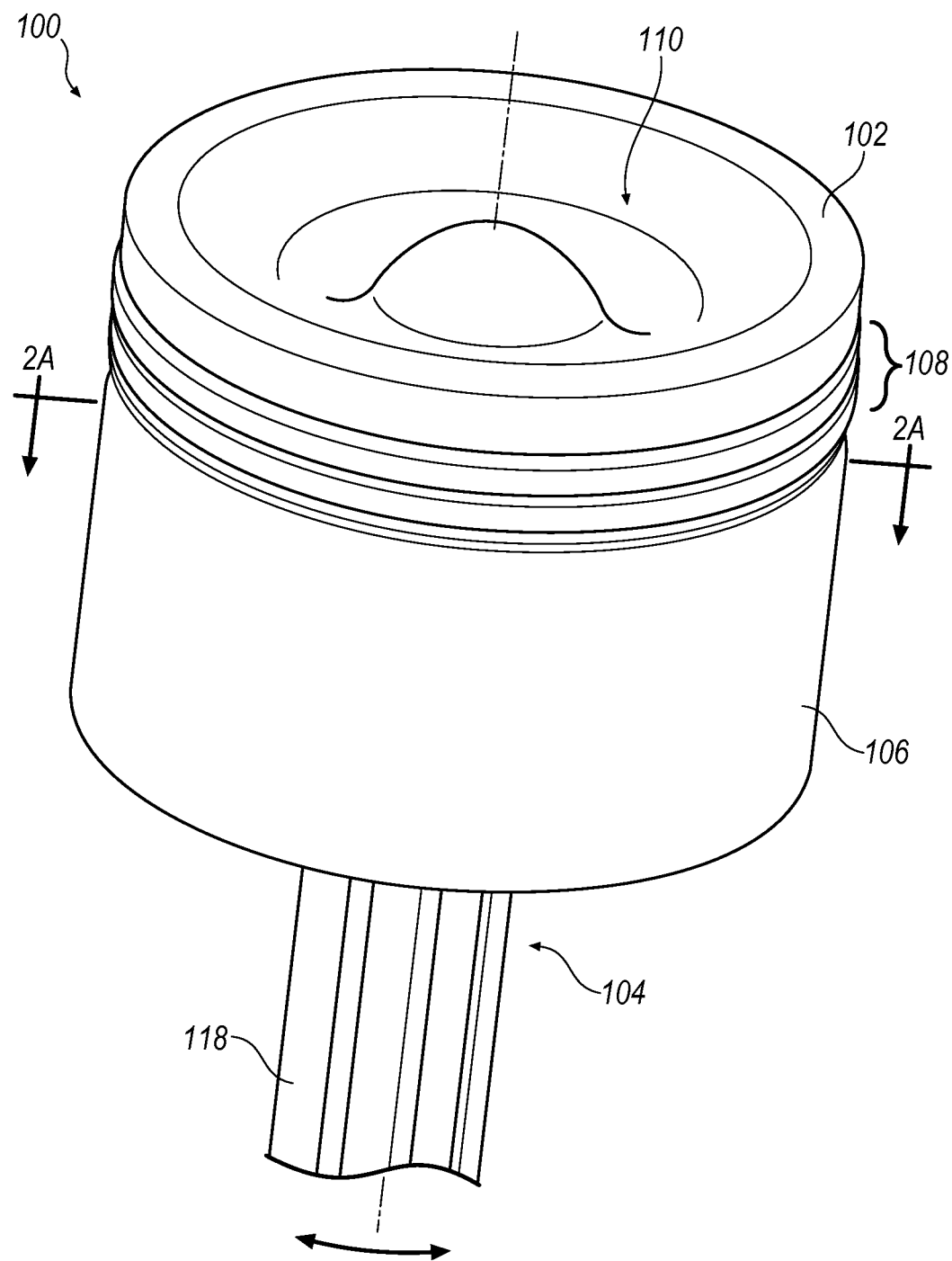
FIG. 1 is a perspective view of an exemplary piston assembly.

Turning now to FIG. 1, an exemplary power cell assembly 100 is illustrated. Power cell assembly 100 may include a piston crown 102 and a connecting rod 104. Connecting rod 104 may include a shank portion 118 and a head portion 120 (not shown in FIG. 1). As will be described further below, the connecting rod 104 may be selectively secured to the crown 102 without a separately formed piston pin. For example, the connecting rod 104 is selectively secured directly to the crown 102 such that the connecting rod 104 may pivot with respect to the crown 102, e.g., as may be necessary during operation of an engine employing the power cell assembly 100. Connecting rod 104 may include various features to enhance lubrication of the connecting rod 104 and joints with the crown 102 and/or an associated crankshaft (not shown), e.g., bore holes or passages defined within the connecting rod 104, coatings, etc., as may be convenient.

Power cell assembly 100 may further include a skirt 106. Skirt 106 may define a generally circular outer profile and may be configured to support the crown 102 by sliding against associated bore surfaces (not shown) receiving the power cell assembly 100.

Crown 102 may include a ringland 108 that defines one or more circumferentially extending ring grooves. Each of the ring grooves may be provided with a piston ring (not shown) to provide a seal with respect to associated bore surfaces of an engine employing the power cell assembly 100. The crown 102 may also generally define a combustion bowl 110, about which ringland 108 extends in a circumferential manner.

Turning now to FIGS. 2A, 2B, 3A, and 3B, an exemplary power cell assembly 100 is illustrated in further detail. Piston crown 102 may include a pair of downwardly extending the boss portions 112a, 112b. The boss portions 112 generally define a cavity C that is configured to receive a head portion 120 of the connecting rod 104, as will be described further below. Boss portions 112a, 112b each include inwardly extending shoulders 114a, 114b, respectively. Each of the shoulders extend along a bottom edge of each of the boss portions 112. Moreover, the shoulders 114 each define crown running surfaces 116a, 116b. The crown running surfaces 116 generally define an arcuate profile which, as will be described further below, in part defines relative rotation between the connecting rod 104 and crown 102. As best seen in FIG. 3A, the crown running surfaces 116 forms an arc about an axis of rotation A-A of the connecting rod 104. As described further below, in some examples the crown 102 may be formed generally as a single integral piece. For example, the crown 102, including the ringland 108, the boss portions 112, and the shoulders 114, may be forged, cast, or formed in any other process that is convenient.

Figure 2A:
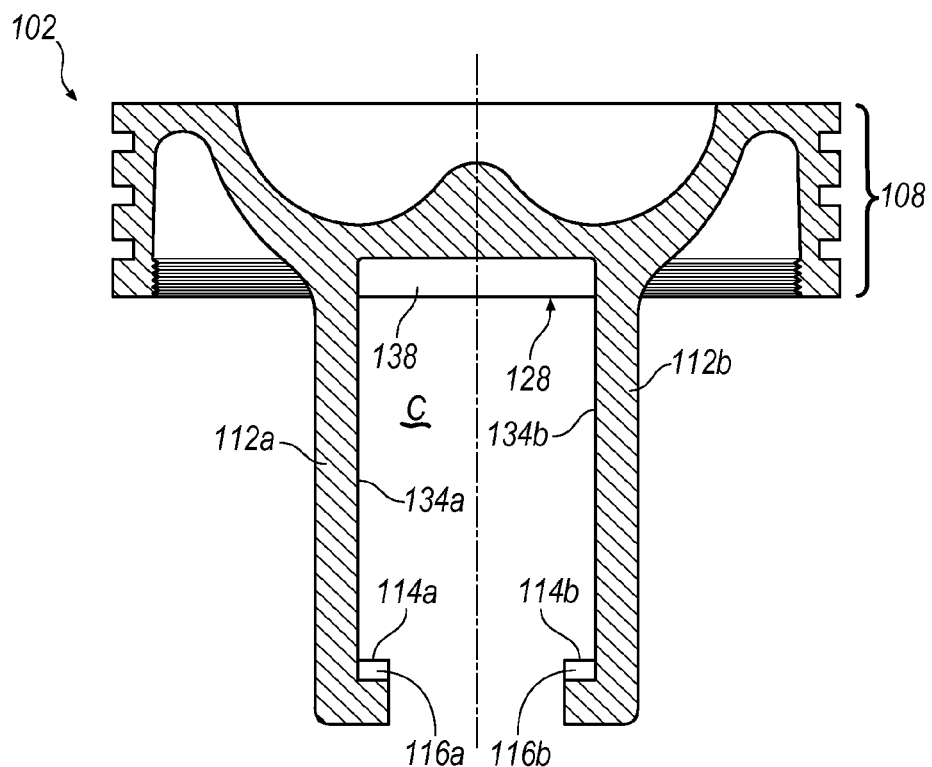
FIG. 2A illustrates a perspective view of an exemplary connecting rod end that is secured to a piston body.
Figure 2B:
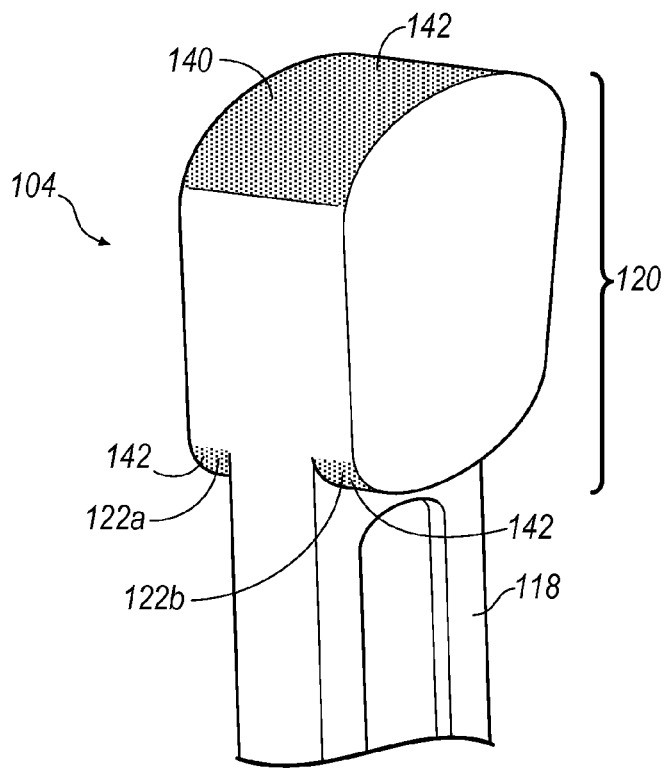
FIG. 2B illustrates a partial sectional view of an exemplary piston body configured to receive the connecting rod end shown in FIG. 2A.
Figure 3C:
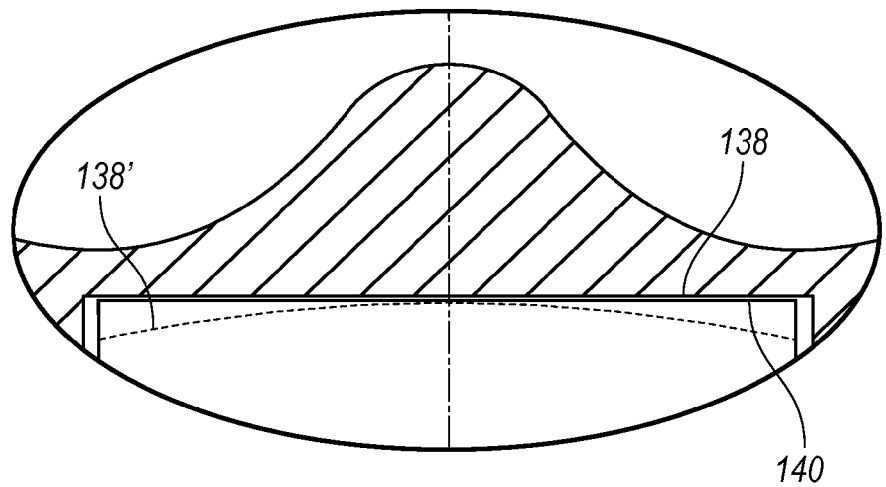
FIG. 3C illustrates an enlarged view of a portion of FIG. 3B.

As best seen in FIGS. 2B and 3A, connecting rod 104 includes a head portion 120. The head portion 120 may define one or more running surfaces that define in part a generally circular shape D, similar to the crown running surfaces 116. The running surfaces and circular shape D thereof generally allow for rotation of the head portion 120 within cavity C of the crown. More specifically, head portion 120 may define running surfaces 122a, 122b. The running surfaces 122 and 116 may generally bear upon one another such that the connecting rod running surfaces 122 slide along the crown running surfaces 116 when the head portion 120 is inserted into the cavity C, as will be described further below. Each of the running surfaces 116, 122 may generally define a similar arcuate profile, i.e., as generally defined by the circular shape D, facilitating rotation of the connecting rod 104 with respect to the crown 102.

The head portion 120 of the connecting rod 104 may also include a generally arcuate upper connecting rod running surface 140 that interfaces with an upper crown running surface 138. As best seen in FIGS. 3A and 3B, upper crown running surface 138 may generally be defined along an underside of the combustion bowl 110 of the crown 102.

The running surfaces 116, 122, 138, and 140 generally define an arc or circular shape D extending about a common axis of rotation A-A with respect to the head portion 120 of the connecting rod 104, as noted above. The arcuate profile of the running surfaces 116 may generally extend laterally along their corresponding boss portion 112, such that the axis of rotation A-A of the connecting rod 104 extends between the boss portions 112. Accordingly, once the connecting rod head portion 120 is inserted into the cavity C of the crown 102, the connecting rod 104 may generally be rotated with respect to the crown 102 as dictated by the arcuate profiles of the running surface 116, 122, 138, and 140. As best seen in FIG. 3A, the running surfaces of the connecting rod 104, i.e., connecting rod running surfaces 122a and 122b, and the running surfaces of the crown 102, i.e., running surfaces 116a and 116b, may each define substantially the same radius R with respect to an axis of rotation of the connecting rod. At the same time, the radii of the running surfaces 116, 122 may typically not be exactly identical, e.g., to provide a clearance between the running surfaces 116, 122 sufficient to allow the running surfaces 116, 122 to slide with respect to each other when the connecting rod 104 is rotated relative to the crown 102. Moreover, the upper running surface 140 of the connecting rod 104 and the upper crown running surface 138 may also define substantially the same radius R with respect to the axis of rotation A-A, again allowing for any necessary clearances between the running surfaces 138, 140.

As best shown in FIGS. 3A and 3B, the boss portions 112a, 112b may include opposing lateral walls 134a, 134b, respectively. The lateral walls 134 may generally extend downward from the combustion bowl 110 of the crown 102. Accordingly, the lateral walls 134 generally restrict the cavity C such that the connecting rod 104 is received between the boss portions 112 within the cavity C. Additionally, the lateral walls 134 may generally prevent the connecting rod 104 from being inserted into the cavity C other than from between the boss portions 112.

As best seen in FIGS. 3A and 3B, the connecting rod head portion 120 may define a maximum dimension, e.g., a circumferential extent or width, $A_1$, that is smaller than opening or gap $A_2$ defined between the upper running surface 138 and the running surface 116 of the boss portions 112. The gap $A_2$ may also be widened with a chamfer or profiling of the edges of the upper running surface 138 and/or the running surface 116. As a result of the gap $A_2$ being larger than a maximum dimension $A_1$ of the head portion 120, the head portion 120 may generally be small enough to be received within the cavity C of the crown 102. While the connecting rod 104 is illustrated in a generally vertical position in FIGS. 3A and 3B, the head portion 120 may be assembled to the crown 102 prior to assembly of the skirt 106 by, e.g., angling the connecting rod 104 and inserting the head portion 120 into cavity C. In one example, the connecting rod 104 may be positioned so that it is approximately horizontal or near-horizontal with respect to the crown 102 (i.e., such that it is parallel or near-parallel with respect to the axis of rotation A-A). The connecting rod 104 may then be inserted until the head portion 120 is received within the cavity C. The connecting rod 104 may then be rotated downwards back toward the vertical position illustrated in FIGS. 3A and 3B, thereby engaging and sliding the running surfaces 116, 122 of the crown 102 and connecting rod 104, respectively. Moreover, the rotation of the connecting rod 104 may also engage the upper running surfaces 138, 140 with one another.

Accordingly, the connecting rod 104 is generally retained by the boss portions 112. Moreover, the head portion 120 may not be removed from the boss portions 112 unless the connecting rod is again rotated, e.g., to a near horizontal position, such that the running surfaces 116, 122 and running surfaces 138, 140 are no longer engaged with one another. The connecting rod 104 may thereby be selectively locked between the boss portions 112 and within cavity C. More specifically, the generally downward facing crown running surface 138 and the generally upward facing crown running surface(s) 116 may retain the head portion 120 therebetween. The running surfaces 116, 122, 138 and 140 may generally remain engaged as the connecting rod 104 pivots with respect to the crown 102 during operation of an engine employing the power cell assembly 100, thereby keeping the head portion 120 retained between the crown running surfaces 138, 116. In other words, an angle required to disengage the running surfaces 116, 122 and running surfaces 138, 140 may generally be greater than a connecting rod swing angle associated with the power cell assembly 100, i.e., a maximum angle defined by the connecting rod 104 with respect to the crown 102 during operation of an engine associated with the power cell assembly 100. In some exemplary illustrations, the angle required to disengage the connecting rod 104 from the crown is substantially greater than a maximum operating angle of the connecting rod 104. In one exemplary illustration, a maximum operating angle of the connecting rod 104 is approximately +/−20 degrees with respect to vertical and/or a longitudinal axis of the crown 102. Moreover, as will be described further below, prior to assembly of the power cell assembly 100, the skirt 106 may also prevent rotation of the connecting rod 104 to an extent that would unlock the connecting rod 104 from the cavity C of the crown 102. Accordingly, the power cell assembly 100 may generally facilitate simplified assembly of the connecting rod 104, crown 102, and skirt 106, while the boss portions 112 retain the connecting rod 104 within the cavity C and prevent instability of the pivoting joint, and moreover prevent the connecting rod 104 from slipping out of connection with the crown 102 during expected operating parameters as well as prior to installation of the power cell assembly 100 to an engine.

As best seen in FIGS. 3A and 3B, skirt 106 may include shoulder portions 124. The shoulder portions 124 cooperate with the piston crown 102 to define a cooling gallery 126. More specifically, the shoulders 124 generally close off the cooling gallery area 126 defined in part by the ringland 108 and combustion bowl 110. Apertures or passages (not shown) may be provided in the upper shoulder 124 to facilitate communication of a lubricant and or a coolant to and/or from the cooling gallery 126. Fluid communication from the cooling gallery 126 may facilitate not only circulation of a coolant throughout the power cell assembly 100, but may also be employed to lubricate the joint between crown 102 and connecting rod head portion 120.

Moreover, the upper shoulder 124 may define a radially inward extent from the ringland 108 such that it defines a gap G with respect to the crown 102. The gap G may reduce or even eliminate any need for additional drain apertures or passages in the skirt 106 or crown 102. More specifically, an inlet aperture 160 (see FIG. 3A) may be provided, through which oil or coolant may be introduced into the cooling gallery 126. Oil or coolant may then circulate through the gallery, eventually escaping from the cooling gallery 126 through the gap G. Thus, additional apertures to allow drainage of the oil and/or cooling from the gallery may not be necessary.

In one exemplary illustration, the gap G is provided around an entire circumference of the power cell assembly 100, and in one example defines a generally consistent gap G about the entire circumference of the crown 102. In another exemplary illustration, the shoulder 124 defines a gap G that varies in magnitude about the circumference of the crown 102. In one exemplary illustration, gap G is on the order of approximately 0.5 to 1.0 millimeters. Moreover, the shoulder 124 may contact the crown at its radially inner end at defined positions about a circumference of the crown, thereby forming a corresponding plurality of discrete gaps G at predetermined locations about a circumference of the power cell assembly 100. In other words, in some areas about a circumference of the crown 102, the shoulder 124 may contact the crown 102, while in other areas about the circumference of the crown 102 the shoulder 124 may define a gap G with respect to the crown 102. In another exemplary illustration, the gap G may be defined in one or more discrete positions about a circumference of the cooling gallery 126, and may be spaced circumferentially away from inlet aperture 160. For example, a gap G may be provided in a location spaced circumferentially away from the inlet aperture 160, thereby encouraging oil or coolant to circulate about the circumference of the cooling gallery 126 before it is circulated back out of the cooling gallery 126 via the gap G.

Skirt 106 may be selectively secured to the crown 102 via any manner that is convenient. For example, as shown in FIGS. 3A and 3B, a threaded connection may be provided to allow selective securement of the skirt 106 to the crown 102. More specifically, threads 130 may be provided about a circumference of the skirt 106 that mate with corresponding threads 132 of the crown 102. Alternatively, or in addition, the skirt 106 may be secured to the crown 102 using, merely as examples, welding, adhesives, or a bayonet locking arrangement. Moreover, a connection between the skirt 106 and the crown 102 may be provided with a seal or 0-ring 150 extending about a circumference of the crown 102 and skirt 106. Accordingly, loss of coolant or lubricant through the connection between the skirt 106 and ringland 108 of the crown 102 may be generally minimized or prevented entirely.

As noted above, the connecting rod 104 and crown 102 define a plurality of arcuate running surfaces that generally allow the connecting rod 104 to pivot or rotate with respect to the crown 102. Moreover, any one or more of the running surfaces 116, 122, 138, and 140 may be treated with a coating to facilitate relative rotation of the connecting rod 104 with respect to the crown 102, e.g., during operation of an engine employing power cell assembly 100. For example, a low friction coating may be applied to any of the running surfaces 116, 122, 138, and 140, thereby facilitating rotation of the connecting rod 104 with respect to the crown 102 by reducing friction and increasing efficiency of the power cell assembly.

One or more of the connecting rod running surfaces 122, 140 may be profiled in a direction generally parallel to axis A-A, e.g., to reduce edge loading between the relevant connecting rod running surface and its corresponding crown running surface. For example, as best seen in FIG. 3C, a profiled connecting rod running surface 140' (shown in phantom) may be profiled or generally rounded with respect to the crown running surface 138 (and the connecting rod running surface 140 described above, illustrated in FIG. 3C for comparison) such that it defines a smaller radius with respect to axis A-A along an edge of the head portion 120. In one exemplary illustration, the reduced radii of the profiled surface 140' may be very small, e.g., less than one millimeter, and in another example may be on the order of a few microns (μm).

The above described exemplary power cell assembly 100 generally allows for any variety of forming methods and materials to be employed. For example, in contrast to some joining approaches such as welding, where material selection may be limited by requirements for similar or identical materials to be used for joined components, the threaded connection between the crown 102 and the skirt 106 allows for a comparatively larger selection of materials to be used. Additionally, there is virtually no limitation on the different materials that may be used for the crown 102 and connecting rod 104. Moreover, the various components may each be formed of different materials more specifically tailored to application requirements for the components, e.g., higher strength, lower thermal conductivity, etc., as will be described further below.

Additionally, the power cell assembly 100, by virtue of the low overall height of the piston, i.e., as defined by the crown 102 and skirt 106, allows for a generally low center of gravity of the crown 102 and skirt 106. The elimination of the piston pin reduces the need for any clearance between the connecting rod 104 and the crown 102, thereby further increasing the degree to which the power cell assembly 100 may be made more compact. For example, the substantial elimination of clearance between the connecting rod 104 and the underside of the combustion bowl 110 decreases the overall vertical height of the crown 102. Accordingly, the power cell assembly 100 generally provides for increased design flexibility. Additionally, in some examples the center of gravity may be very close to the joint between the connecting rod 104 and the crown 102, thereby positively influencing cavitation and noise-vibration/harshness characteristics of the power cell assembly 100, e.g., by reducing second order dynamics of the piston. In other words, as the center of gravity of the crown 102 is lowered with respect to the connecting rod 104, e.g., such that the center of gravity is close to or as low as the axis of rotation A-A of the connecting rod 104, variations in the forces applied by the crown 102 to associated bore surfaces during the reciprocating motion of the power cell assembly 100 may be generally reduced.

Figure 4:
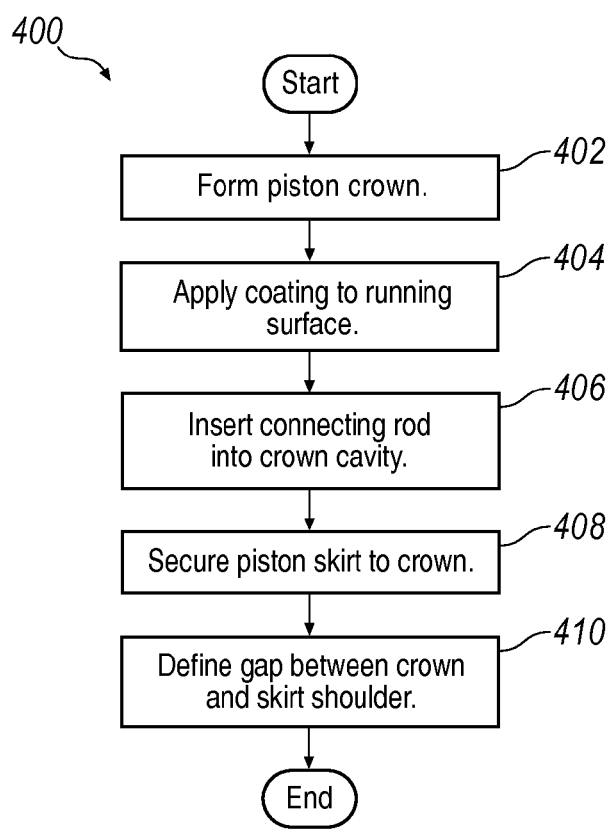
FIG. 4 illustrates a process flow diagram of an exemplary method of making a power cell assembly.

Turning now to FIG. 4, an exemplary process of assembling a power cell assembly, e.g., power cell assembly 100, is described. Process 400 may generally begin at block 402, where a piston crown is formed. For example, as described above a piston crown 102 may be formed that includes a ringland 108 extending circumferentially about a combustion bowl 110. Moreover, boss portions 112a, 112b may be provided that extend generally downward from the combustion bowl 110 to define a cavity C therebetween. The boss portions 112 may each include inwardly extending shoulders 114 which in turn define arcuate crown running surfaces 116, as described above. The piston crown 102 may be formed in any process that is convenient, e.g. forging, casting, or machining, merely as examples.

At block 404, a coating may be applied to at least one of the running surfaces. For example, as described above a low friction coating 142 may be applied to any of the running surfaces 116, 122, 138, and 140. In one exemplary illustration, a low friction coating is applied to any of the running surfaces to reduce friction as the connecting rod 104 pivots with respect to the crown 102, e.g., during operation of an engine and power cell assembly 100.

Proceeding to block 406, a connecting rod may be inserted into the crown. For example, as described above connecting rod 104 may have a shank 118 extending away from a head portion 120, which is joined to a crankshaft or large end (not shown) of the connecting rod 104. The head portion 120 may generally be inserted into the cavity C of the crown 102. The head portion 120 of the connecting rod may generally define arcuate running surfaces 122a, 122b that are positioned to engage the crown running surfaces 116a, 116b. As noted above, the mating of the crown running surfaces 116 and the connecting rod running surfaces 122 generally allows the connecting rod 104 to pivot with respect to the crown 102 about an axis of rotation A-A that extends from one of the boss portions 112 to the other of the boss portions 112.

A vertical gap, e.g., gap $A_2$, may be provided between an upper crown running surface 138 defined by an underside of the combustion bowl of the crown 102 and the lower crown running surfaces 116 defined by the boss portions 112. The vertical gap, e.g., $A_2$, may be greater than a width or circumferential extent of the head portion 120 of the connecting rod 104. Accordingly, the head portion 120 may generally be made small enough to allow insertion of the head portion 120 into the vertical gap $A_2$. The connecting rod 104 may thus be angled with respect to the crown 102, e.g., in a generally horizontal manner, and the head portion 120 inserted into the cavity C through the gap $A_2$. In this manner, during insertion the connecting rod 104 may be generally positioned such that a longitudinal axis of the connecting rod 104 is generally orthogonal to a longitudinal axis of the crown 102.

Upon insertion of the head portion 120 of the connecting rod 104 into the cavity C, the connecting rod 104 may be pivoted or rotated downward with respect to the crown 102 such that the longitudinal axis of the connecting rod is vertical or approaches a vertical alignment, thereby bringing the running surfaces 116 and 122, as well as the running surfaces at 138 and 140, into alignment. Moreover, the alignment of the running surfaces 116, 122 and the running surfaces 138, 140 may generally prevent removal of the connecting rod from the cavity C of the crown 102. More specifically, the connecting rod 104 may only be removed from the crown by rotating the connecting rod 104 back toward a horizontal position such that the lower running surfaces 116, 122, as well as the upper running surfaces 138, 140, are each disengaged from one another to allow removal of the head portion 120 through the vertical gap $A_2$.

Proceeding to block 408, a piston skirt may be secured to the crown. For example, as described above a piston skirt 106 may be secured to ringland 108 of the crown 102. The skirt 106 may include an upper shoulder 124 that cooperates with the piston crown 102 to define a cooling gallery 126 adjacent the ringland 108. As also noted above, piston skirt 106 may be provided with threads 130 that allow for selective securement of the skirt 106 to the crown 102. For example, the crown 102 may define corresponding threads 132 which allow engagement of this skirt threads 130.

Securement of the skirt 106 may also generally prevent removal of the connecting rod 104 from the crown 102 or dislodging of the connecting rod 104 from the cavity C of the crown 102. More specifically, skirt 106 may extend low enough to prevent rotation of the connecting rod 104 with respect to the crown 102 to an extent that would disengage the lower running surfaces 116, 122 and the running surfaces 138, 140 from one another.

The threaded connection between the skirt 106 and the crown 102 may advantageously allow for simplified assembly and service of the power cell assembly 100. More specifically, the skirt 106 and the crown 102 may be easily assembled and disassembled, e.g. to service one or more of the components. In examples where the large end of the connecting rod (not shown) is larger than the skirt 106, such that the big end cannot be inserted through the skirt 106, the skirt 106 may be assembled over the head portion 120 of the connecting rod 104 and down onto the shank portion 118 of the the connecting rod 104. The connecting rod 104 may subsequently be inserted into the cavity C of the crown 102, in the manner described above. Alternatively, if the big end of the connecting rod is small enough to be assembled to the crown 102 through the skirt 106, the skirt 106 may be placed over the big end of the connecting rod and along the shank portion 118 of the connecting rod 104 after the connecting rod 104 is assembled to the crown 102.

As noted above, the piston crown 102 and skirt 106 may be formed of any materials that are convenient. Moreover, the crown 102 and skirt 106 may be formed of the same material or alternatively may be formed of different materials. For example, the skirt 106 may in some applications be formed of a material which is of a lighter weight, e.g., aluminum, or a lower thermal conductivity, e.g., Inconel, than the crown 102. By contrast, the crown 102 may employ a high strength material, e.g. steel, cast iron, aluminum material, composite, or powdered metal material, merely as examples. Moreover, crown 102 may be formed of a different material from the skirt 106 and/or the connecting rod 104 such that it includes different mechanical properties, e.g., yield point, tensile strength or notch toughness, than the skirt 106 and/or connecting rod 104. Any material or combination may be employed for the crown 102, connecting rod 104, and skirt 106 that is convenient. The crown 102, connecting rod 104, and skirt 106 may also be formed in different processes, e.g., the crown 102 and connecting rod 106 may be a generally single forged pieces, while the skirt 106 may be cast of aluminum or steel, or may be forged from steel, formed in a powdered metal operation, or formed of a composite material, merely as examples. In another exemplary illustration, the connecting rod 104 may be machined, e.g., to provide the running surfaces 122 and 138. Accordingly, any material and/or forming combination may be employed that is convenient. Process 400 may then proceed to block 410.

At block 410, a gap may be defined between the crown and skirt shoulder. For example, as described above upper shoulder 124 of the skirt 106 may extend radially inwardly from the ringland 108 of the crown such that it defines a gap G with the crown 102 at the radially inboard side of the cooling gallery 126. The gap G may be used to allow fluid communication between the cooling gallery 126 and an undercrown zone of the piston. More specifically, a coolant/lubricant circulated through the cooling gallery 126 may be circulated from the cooling gallery 126 and around the running surfaces 116, 122, 138, and 140. Accordingly, the coolant/lubricant circulated through the cooling gallery 126, e.g., engine oil, may provide both a cooling effect and a lubricating effect to the joint between the connecting rod 104 and the crown 102. Additionally, circulation of the coolant via gap G to an underside of the combustion bowl 110 may facilitate enhanced cooling of the crown 102 in and around the combustion bowl 110. Moreover, as noted above a gap G may be defined between the shoulder 124 and crown around an entire portion of a circumference of the crown, or may alternatively be defined at discrete intervals or positions spaced about the circumference of the crown. Process 400 may then terminate.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

Accordingly, it is to be understood that the above description is intended to be illustrative and not restrictive. Many embodiments and applications other than the examples provided would be upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their broadest reasonable constructions and their ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

What is claimed is:

1. A power cell assembly, comprising:
    a piston crown, including a ringland extending circumferentially about a combustion bowl, and two boss portions extending downward from the combustion bowl to define a cavity therebetween, and defining an axis of rotation extending from one of the boss portions to the other of the boss portions, the boss portions each including inwardly extending shoulders that extend in a direction that is colinear with the axis of rotation, defining arcuate crown running surfaces, wherein the shoulders are integrally formed of a single piece with the combustion bowl; and
    a connecting rod having a shank and an upper end received in the cavity, the upper end defining arcuate connecting rod running surfaces extending away from the shank and in the direction that is colinear with the axis of rotation, the arcuate running surfaces positioned to mate with the crown running surfaces, thereby allowing the connecting rod to pivot with respect to the piston crown about the axis of rotation, wherein an underside of the combustion bowl of the crown defines an upper crown running surface configured to mate with a corresponding upper running surface of the connecting rod while pivoting about the axis of rotation.

2. The power cell assembly of claim 1, further comprising a piston skirt extending downward from the outer ringland of the crown.

3. The power cell assembly of claim 2, wherein the skirt includes an upper shoulder cooperating with the piston crown to define a cooling gallery.

4. The power cell assembly of claim 3, wherein the upper shoulder extends radially inwardly from the ringland of the crown to define a gap with the crown, the gap configured to allow fluid communication between the cooling gallery and an undercrown zone of the piston.

5. The power cell assembly of claim 1, wherein the skirt is selectively secured to the crown with a threaded connection.

6. The power cell assembly of claim 1, wherein the boss portions include opposing lateral walls extending downward from the combustion bowl, thereby restricting the cavity such that the connecting rod is inserted between the boss portions.

7. The power cell assembly of claim 1, wherein the upper crown running surface cooperates with the crown running surfaces defined by the boss portions to define a vertical gap therebetween, and the upper connecting rod running surface defines a circumferential extent smaller than the vertical gap, thereby allowing insertion of the connecting rod head into the cavity through the vertical gap.

8. The power cell assembly of claim 1, wherein at least one of the running surfaces includes a coating.

9. The power cell assembly of claim 1, wherein the piston crown is forged.

10. The power cell assembly of claim 1, wherein the piston crown and piston skirt are formed of different materials.

11. A method, comprising:
forming a piston crown including a ringland extending circumferentially about a combustion bowl, and two boss portions extending downward from the combustion bowl to define a cavity therebetween, and defining an axis of rotation extending from one of the boss portions to the other of the boss portions, the boss portions each including inwardly extending shoulders that extend in a direction that is colinear with the axis of rotation, defining arcuate crown running surfaces, wherein the shoulders are integrally formed of a single piece with the combustion bowl; and
inserting a connecting rod having a shank and an upper end into the cavity, the upper end defining arcuate connecting rod running surfaces extending away from the shank and in the direction that is colinear with the axis of rotation, the arcuate running surfaces positioned to mate with the crown running surfaces, thereby allowing the connecting rod to pivot with respect to the piston crown about the axis of rotation, wherein an underside of the combustion bowl of the crown defines an upper crown running surface configured to mate with a corresponding upper running surface of the connecting rod while pivoting about the axis of rotation.

12. The method of claim 11, further comprising securing a piston skirt to the outer ringland of the crown, the skirt extending downward from the outer ringland.

13. The method of claim 12, wherein the skirt includes an upper shoulder cooperating with the piston crown to define a cooling gallery.

14. The method of claim 13, wherein securing the skirt to the crown includes locating the upper shoulder of the skirt such that the upper shoulder extends radially inwardly from the ringland of the crown to define a gap with the crown, the gap configured to allow fluid communication between the cooling gallery and an undercrown zone of the piston.

15. The method of claim 12, further comprising forming the shoulders and the combustion bowl in one of a forging and a casting process.

16. The method of claim 11, wherein inserting the connecting rod includes inserting the connecting rod through a vertical gap between an upper crown running surface defined by an underside of the combustion bowl of the crown and the crown running surfaces defined by the boss portions, wherein the upper connecting rod running surface defines a circumferential extent smaller than the vertical gap thereby allowing insertion of the connecting rod head into the cavity through the vertical gap.

17. The method of claim 16, wherein inserting the connecting rod includes positioning the connecting rod at an angle such that the upper connecting rod surface is inserted into the cavity.

18. The method of claim 16, wherein inserting the connecting rod includes rotating the connecting rod downward such that the alignment of the mating surfaces prevents removal of the connecting rod from the cavity.

19. A power cell assembly, comprising:
a piston crown, including a ringland extending circumferentially about a combustion bowl, and two boss portions extending downward from the combustion bowl to define a cavity therebetween, and defining an axis of rotation extending from one of the boss portions to the other of the boss portions, the boss portions each including inwardly extending shoulders that extend toward one another and colinear with the axis of rotation, defining arcuate crown running surfaces; and
a connecting rod having a shank and an upper end received in the cavity, the upper end defining arcuate connecting rod running surfaces extending away from the shank and in the direction that is colinear with the axis of rotation, the arcuate running surfaces positioned to mate with the crown running surfaces, thereby allowing the connecting rod to pivot with respect to the piston crown about the;
wherein an underside of the combustion bowl of the crown defines an upper crown running surface configured to mate with a corresponding upper running surface of the connecting rod while pivoting about the axis of rotation; and
wherein the upper crown running surface cooperates with the crown running surfaces defined by the boss portions to define a vertical gap therebetween, and the upper connecting rod running surface defines a circumferential extent smaller than the vertical gap, thereby allowing insertion of the connecting rod head into the cavity through the vertical gap.

20. A power cell assembly, comprising:
a piston crown, including a ringland extending circumferentially about a combustion bowl, and two boss portions extending downward from the combustion bowl to define a cavity therebetween, and defining an axis of rotation extending between the boss portions and orthogonal to surfaces thereof, the boss portions each including inwardly extending shoulders that extend in a direction that is colinear with the axis of rotation, defining arcuate crown running surfaces, wherein the shoulders are integrally formed of a single piece with the combustion bowl;
a piston skirt extending downward from the outer ringland of the crown; and
a connecting rod having a shank and an upper end received in the cavity, the upper end defining arcuate connecting rod running surfaces extending away from the shank and in the direction that is colinear with the axis of rotation, the arcuate running surfaces positioned to mate with the crown running surfaces, thereby allowing the connecting rod to pivot with respect to the piston crown about the axis of rotation, wherein an underside of the combustion bowl of the crown defines an upper crown running surface configured to mate with a corresponding upper running surface of the connecting rod while pivoting about the axis of rotation;

wherein the boss portions include opposing lateral walls extending downward from the combustion bowl, thereby restricting the cavity such that the connecting rod is inserted between the boss portions;

wherein an underside of the combustion bowl of the crown defines an upper crown running surface configured to mate with a corresponding upper running surface of the connecting rod; and wherein the upper crown running surface cooperates with the crown running surfaces defined by the boss portions to define a vertical gap therebetween, and the upper connecting rod running surface defines a circumferential extent smaller than the vertical gap, thereby allowing insertion of the connecting rod head into the cavity through the vertical gap, such that the connecting rod is coupled with the crown by positioning the connecting rod at an angle, inserting the upper connecting rod surface into the cavity while the connecting rod is maintained at the angle, and rotating the connecting rod downward such that the alignment of the mating surfaces prevents removal of the connecting rod from the cavity.

* * * * *